(12) United States Patent
Enevoldsen et al.

(10) Patent No.: US 8,568,103 B2
(45) Date of Patent: Oct. 29, 2013

(54) WIND TURBINE ROTOR BLADE

(75) Inventors: Peder Bay Enevoldsen, Vejle (DK);
Søren Hjort, Brande (DK)

(73) Assignee: Siemens Aktiengesellschaft, München (DE)

( * ) Notice: Subject to any disclaimer, the term of this patent is extended or adjusted under 35 U.S.C. 154(b) by 678 days.

(21) Appl. No.: 12/226,073

(22) PCT Filed: Feb. 26, 2007

(86) PCT No.: PCT/EP2007/051789
§ 371 (c)(1),
(2), (4) Date: Oct. 7, 2008

(87) PCT Pub. No.: WO2007/115861
PCT Pub. Date: Oct. 18, 2007

(65) Prior Publication Data
US 2009/0142197 A1 Jun. 4, 2009

(30) Foreign Application Priority Data
Apr. 10, 2006 (EP) .................................. 06007514

(51) Int. Cl.
*B23K 5/18* (2006.01)
(52) U.S. Cl.
USPC ....................... 416/223 R; 416/239
(58) Field of Classification Search
USPC ............................. 416/223 R, 239
See application file for complete search history.

(56) References Cited

U.S. PATENT DOCUMENTS

| 976,587 A | 11/1910 | McNair |
|---|---|---|
| 4,408,958 A | 10/1983 | Schacle |
| 4,858,852 A | 8/1989 | Henne et al. |
| 4,976,587 A | 12/1990 | Farone |
| 5,474,425 A | 12/1995 | Lawlor |
| 2004/0013512 A1 | 1/2004 | Corten |
| 2006/0099076 A1* | 5/2006 | Wobben ................ 416/132 B |

FOREIGN PATENT DOCUMENTS

| DK | 9500009 U3 | 4/1996 |
|---|---|---|
| EP | 1314885 A1 * | 5/2003 |
| EP | 13144385 A1 | 5/2003 |
| WO | WO 9607825 A1 | 3/1996 |
| WO | WO 0015961 A1 | 3/2000 |
| WO | WO 03/014656 A1 | 2/2003 |
| WO | WO 2004/097215 A1 | 11/2004 |

OTHER PUBLICATIONS

Hampsey, "Multiobjective Evolutionary Optimisation of Small Wind Turbine Blades", Aug. 2002, University of Newcastle, Newcastle (Australia), XP002484089.*

(Continued)

*Primary Examiner* — Michael Lebentritt

(57) ABSTRACT

A wind turbine rotor blade with a suction side and a pressure side is provided. The blade includes a cylindrical root portion, an airfoil portion defining the suction side and the pressure side, and a transition portion which is located between the airfoil portion and the root portion. The transition portion has a transition profile changing from the airfoil of the airfoil portion to the cylindrical profile of the root portion. The leading section of the transition profile is cylindrical and the trailing section of the transition profile is elongated. In the rotor blade, the maximum chord length of the airfoil portion is at least the maximum chord length of the transition portion. In addition, the transition profile includes a section with a concave curvature on the pressure side of the rotor blade.

12 Claims, 4 Drawing Sheets

(56) References Cited

OTHER PUBLICATIONS

Peter Fuglsang, Christian Bak, "Development of the Riso Wind Turbine Airfoils", Wind Energy, 2004, No. 7; Roskilde; XP008068651; Magazine; 2004; DK, pp. 145-162.
Kentfield et al: "The Flow Physics of Gurney Flaps, Devices for Improving Turbine Blade Performance", The 16th Annual Energy-Sources Technology Conference and Exhibition, Houston, Texas, 1993, E4, pp. 29-35.
Frederik Zahle. "Computational Study of the Risoe B1-24 Profile fitted with Gurney Flaps", Master's Thesis Provisional Results, Jun. 18, 2003, E6, pp. 1-87.
Kristian S. Dahl et al: "Experimental Vertification of the new Risoe-A1 Airfoil Family for Wind Turbines", 1999 European Wind Energy Conference, Mar. 1-5, 1999, Nice, France, E7, pp. 85-88.
W. A. Timmer et al: "The Effect of Stall Strips, Gurney Flaps and Vortex Generators on the Performance of a Stall Controlled Wind Turbine", 5th European Wind Energy Association Conference and Exhibition, Oct. 10-14, 1994, E8, pp. 1-8.
W. A. Timmer et al: "The Design and Testing of Airfoil DU 91-W2-250 Including the Effect of Vortex Generators and Gurney Flaps", 6th IEA Symposium on the Aerodynamics of Wind Turbines, Petten, NL, 1992, E9, pp. 1-14.
Ye Zhiquan et al: "Experiment Research on the Lift Enhancement of an Airfoil Using Trailing Edge Flaps", 1999 European Wind Energy Conference, Mar. 1-5, 1999, Nice, France, pp. 105-108, E10.
W. A. Timmer et al: "DU 94-W-280, A Thick Airfoil with a Divergent Trailing Edge", 1996 European Union Wind Energy Conference, May 20-24, 1996, H. S. Stephens & Associates, Bedford UK, pp. 737-740, E16.
C. Lindenburg: "Tapered LMH64-5 Blade—6MW Blade Variant with Increased Taper", DOWEC-02-KL-084/0, Aug. 2002, E17, pp. 1-122.
Communication from European Patent Office stating cited references, Jan. 12, 2012, pp. 1-10.
Dansk-Engelsk Ordbog—Dictionary definition of Vinge, Vinterberg & Bodelsen "Dansk-Engelsk Ordbog—Dictionary definition of Vinge", 1998 by Gyldendalske Boghandel, 4 Udgave, 3 Oplag, 4 pages.
Fuglsang, Sangill, Hansen "Design of a 21 m Blade with Riso-A1 Airfoils for Avtive Stall Controlled Wind Turbines", Riso National Laboratory, Roskilde, Dec. 2002, pp. 1 to 58.

\* cited by examiner

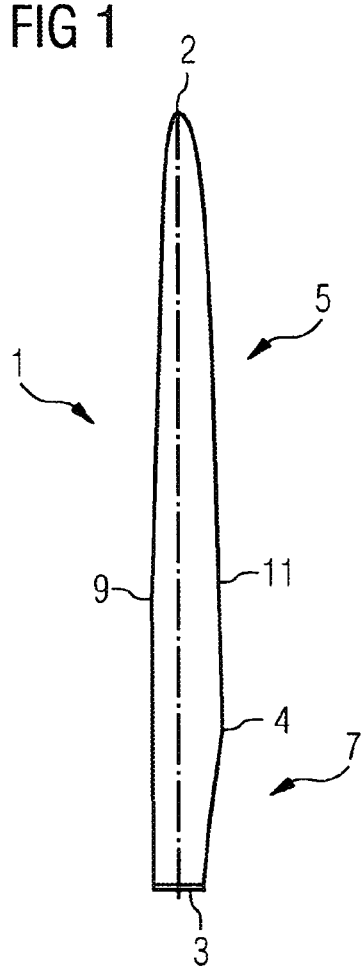
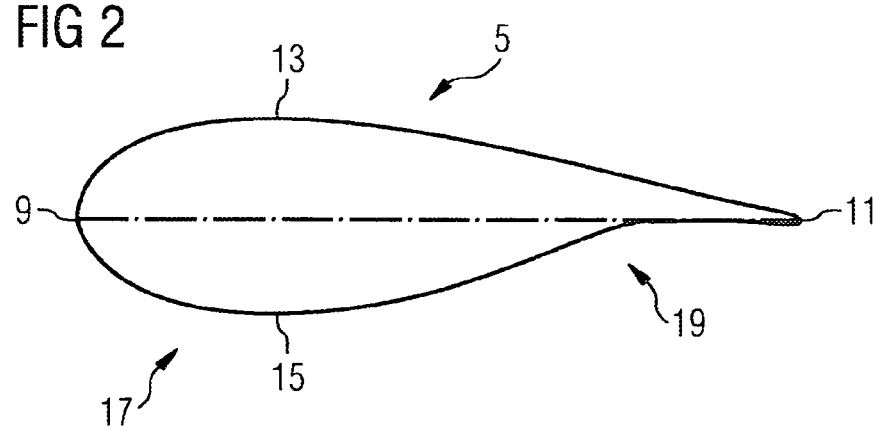

WIND TURBINE ROTOR BLADE

CROSS REFERENCE TO RELATED APPLICATIONS

This application is the US National Stage of International Application No. PCT/EP2007/051789, Feb. 26, 2007 and claims the benefit thereof. The International Application claims the benefits of European Patent Office application No. 06007514.0 EP filed Apr. 10, 2006, both of the applications are incorporated by reference herein in their entirety.

FIELD OF INVENTION

The present invention relates to a wind turbine rotor blade with a cylindrical root portion, an airfoil portion and a transition portion which is located between the airfoil portion and the root portion.

BACKGROUND OF INVENTION

A state of the art rotor blade for a wind turbine is, e.g., described in EP 1 314 885 A1. Such a blade comprises a root portion having a cylindrically shaped cross section, by which the rotor blade is fixed to a hub of the rotor, and an airfoil portion with an aerodynamically shaped cross section. The cylindrically shaped cross section of the root part is used to fix the blade to a bearing at the rotor hub.

A transition portion is located between the airfoil portion and the root portion over which the blade's profile changes from the aerodynamic airfoil to the cylindrical profile. The transition from the airfoil portion to the root portion typically begins at a so-called shoulder of the blade, which is given by the location of the blade's largest chord. The chord is an imaginary line, measured in the direction of the normal airflow, from the leading edge of the blade to its trailing edge. The shoulder typically lies at about 20% of the rotor blade's span, which is the length of the blade from the root to the outermost part of the blade, the so-called tip.

A focus in the aerodynamic properties of a wind turbine blade mostly concentrates on the airfoil portion. The transition area is often regarded as not contributing significantly to the power production of the wind turbine.

To improve the aerodynamic properties of the inner part of a wind turbine rotor blade it has been proposed in WO2003/014646 A1 to increase the width of the blade, i.e. the dimension along the chord, near the rotor hub so that the greatest width can be found close to the hub. However, this leads to higher loads at the tower to which the rotor is fixed, to higher production costs and to difficulties in transporting the blade. Consequently, it has been proposed in WO2004/097215 A1 to implement such a blade in a two-part form.

SUMMARY OF INVENTION

With respect to the mentioned state of the art, it is an objective of the present invention to provide an improved wind turbine rotor blade.

This objective is solved by a wind turbine rotor blade, as defined in the independent claims. The dependent claims define further developments of the present invention.

An inventive wind turbine rotor blade with a suction side and a pressure side comprises a cylindrical root portion, an airfoil portion and a transition portion. The airfoil portion defines the suction side and the pressure side of the blade. The transition portion is located between the airfoil portion and the root portion and has a transition profile changing from the airfoil of the airfoil portion to the cylindrical shape of the root portion, its leading section being cylindrical and its trailing section being elongated. In the inventive wind turbine rotor blade, the maximum chord length of the airfoil portion is at least the maximum chord length of the transition portion, and in particular larger than that. Moreover, the transition profile comprises a section with a concave curvature on the pressure side of the blade. In a particular implementation, the section with the concave curvature does not begin before 60% of the chord length measured from the leading edge of the transition profile. In a further advantageous implementation of the invention, the transition profile's section with the concave curvature extends to 100% chord length.

By introducing a concave curvature to the pressure side of the blade's transition profile without enlarging its profile width, i.e. its chord length, over the profile width of the airfoil portion the aerodynamics of the blade's transition portion can be improved without the difficulties mentioned in regard to the prior art, i.e. without significantly increasing the tower loads, without significantly increasing production costs and without leading to transport difficulties. Hence, implementing the inventive rotor blade in two parts for transportation reasons is not necessary. A two-part rotor blade would always have a weakness in the connection zone of both parts unless considerable effort is made to overcome such a weakness.

An advantageous effect can already be achieved if the section with the concave curvature extends only over the last 20% of the transition profile, i.e. from 80% chord length to 100% chord length. In this case, only minor changes to the state of the art transition profile are necessary.

The concave curvature can be achieved easily by a small area added to the cross section of the state of the art transition profile. This area is called a shell throughout the present application. The concave curvature, and in particular the shell, introduces a considerable aft-loading and increases the lift of the rotor in the same way as a Gurney flap does on a traditional airfoil.

The airfoil portion of the inventive rotor blade may begin at a point of the rotor blade which is located between 15% and 25% of the span, measured from the hub towards the tip of the blade. In particular, the airfoil portion may begin at about 20% of the span.

BRIEF DESCRIPTION OF THE DRAWINGS

Further features, properties and advantages will become clear from the following description of an embodiment of the invention with reference to the accompanying drawings.

FIG. 1 shows a rotor blade in a plan view on the plane defined by the blade's span and the blade's chord.

FIG. 2 shows a chordwise section through the airfoil portion of the blade shown in FIG. 1.

DETAILED DESCRIPTION OF INVENTION

Figure 3:
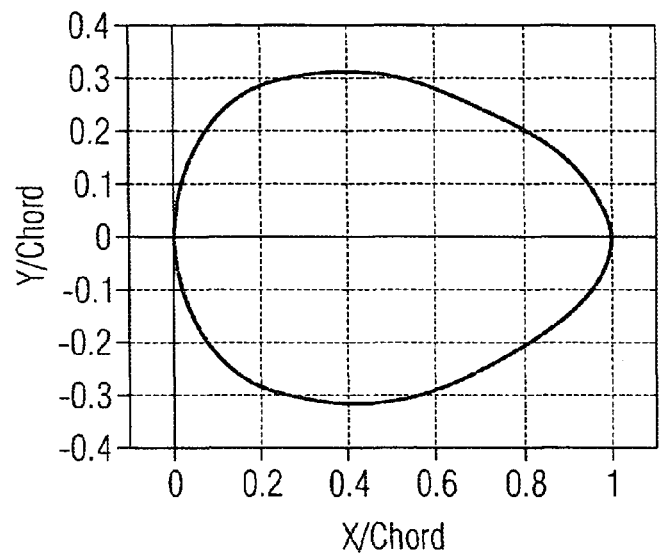
FIG. 3 shows the cross section of a profile of the blade's transition section according to the state of the art.

FIG. 1 shows a wind turbine blade 1 as it is usually used in a three-blade rotor. However, the present invention shall not be limited to blades for three-blade rotors. In fact, it may as well be implemented in other rotors, e.g. one-blade rotors or two-blade rotors.

The rotor blade 1 shown in FIG. 1 comprises a root portion 3 with a cylindrical profile and a tip 2. The tip which forms the outermost part of the blade. The cylindrical profile of the root portion 3 serves to fix the blade to a bearing of a rotor hub. The rotor blade 1 further comprises a so-called shoulder 4 which is defined as the location of its maximum profile depth, i.e. the maximum chord length of the blade. Between the shoulder 4 and the tip 2 an airfoil portion 5 extends which has an aerodynamically shaped profile. Between the shoulder 4 and the cylindrical root portion 3, a transition portion 7 extends in which a transition takes place from the aerodynamic profile of the airfoil portion 5 to the cylindrical profile of the root portion 3.

A chord-wise cross section through the rotor blade's airfoil section 5 is shown in FIG. 2. Their aerodynamic profile shown in FIG. 2 comprises a convex suction side 13 and a less convex pressure side 15. The dash-dotted line extending from the blade's leading edge 9 to its trailing edge 11 shows the chord of the profile. Although the pressure side 15 comprises a convex section 17 and a concave section 19 in FIG. 2, it may also be implemented without a concave section at all as long as the suction side 13 is more convex than the pressure side 15.

The suction side 13 and the pressure side 15 in the airfoil portion 5 will also be referred to as the suction side and the pressure side of the rotor blade 1, respectively, although, strictly spoken, the cylindrical portion 3 of the blade 1 does not show a pressure or a suction side.

A state of the art profile for the transition portion 7 of the rotor blade 1 is shown in FIG. 3. The transition profile's cross section is circular in its leading portion and elongated in its trailing portion, so that it resembles an egg-like shape. It can be seen that it is more or less symmetric about the chord and therefore generates no usable lift for the turbine blade under a wide range of angles of attack of the wind.

Figure 4:
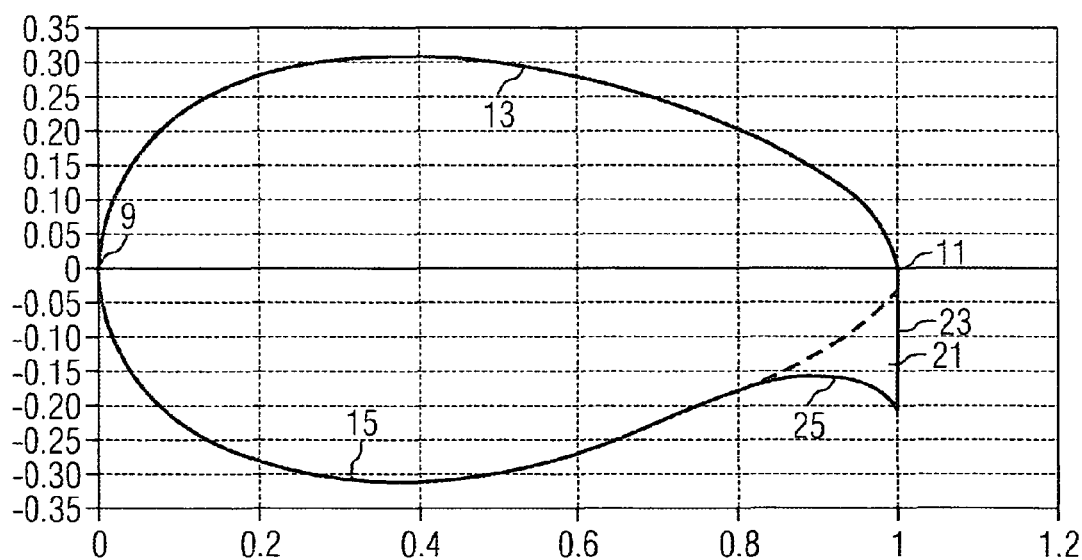
FIG. 4 shows the cross section of a profile of the blade's transition section according to the invention.

The transition profile of the transition portion 7, is shown in FIG. 4. Compared to the state of the art transition profile, its pressure side 15 has been modified in the portion between 80% and 100% chord length by adding an area 21 to the profile's cross section. The state of the art profile in this portion is indicated by the dotted line.

The added area 21 or shell, is delimited by a straight line 23 which extends from the suction side 13 in a perpendicular direction to the chord at 100% chord length. The added area therefore does not increase the profile's depth, i.e. the chord length. The cross section of the added area 21 is further delimited by a concave line 25 which extends in the profile's pressure side 15 from about 80% chord length to 100% chord length. The added area 21 introduces considerable aft loading on the transition portion 7 of the rotor blade 1 and increases the lift in the same way as a Gurney flap (also called wickerbill) on a traditional airfoil.

Figure 7:
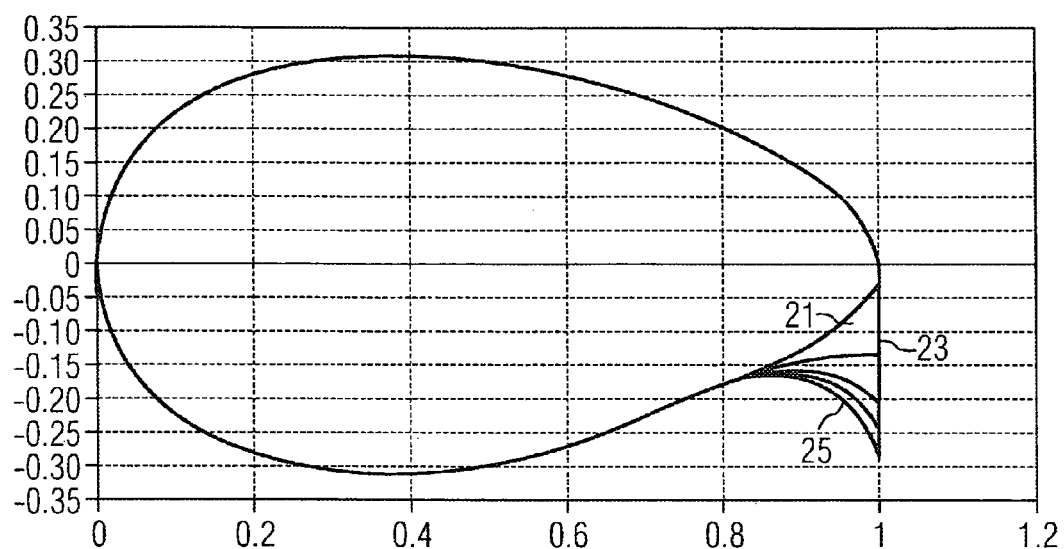
FIG. 7 shows examples of differently scaled geometries of the transition profile's cross section.

The size of the added area 21 may be adapted to different design conditions by scaling, in particular by scaling the length of the straight line 23, as it is indicated in FIG. 7. By the scaling, the straight line 23 delimiting the added area will be shortened or elongated compared to the added area 21 shown in FIG. 4.

Figure 5:
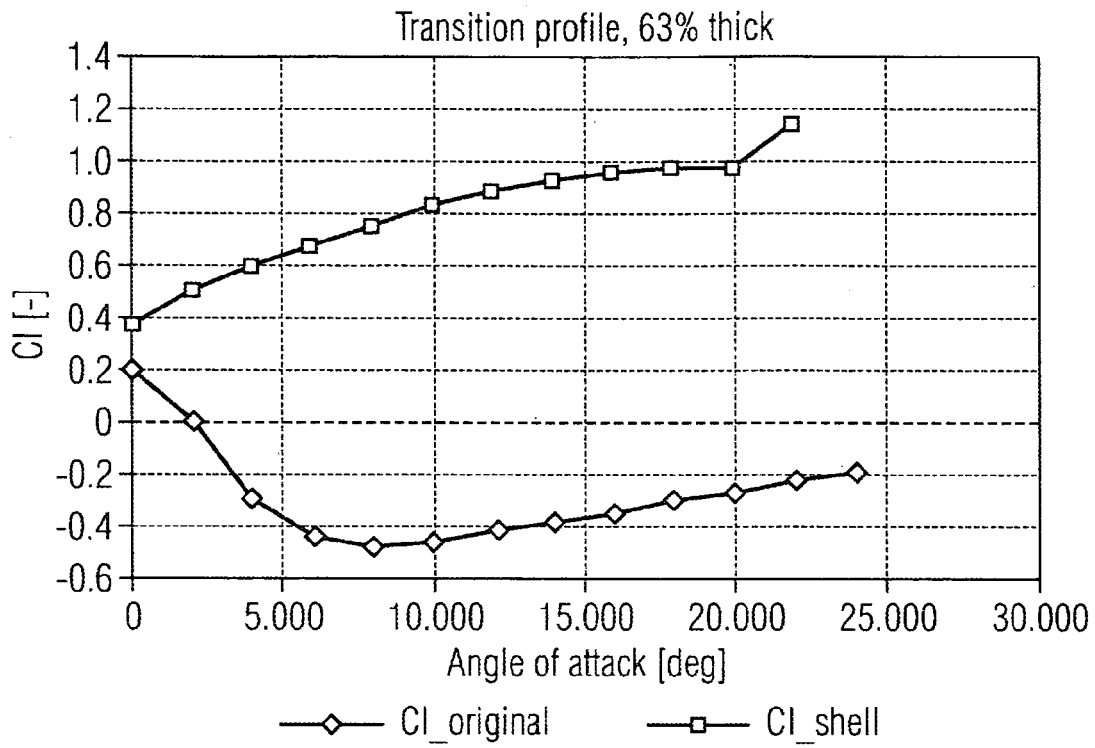
FIG. 5 shows the lift coefficients of the inventive and the state of the art profiles as a function of the angle of attack.
Figure 6:
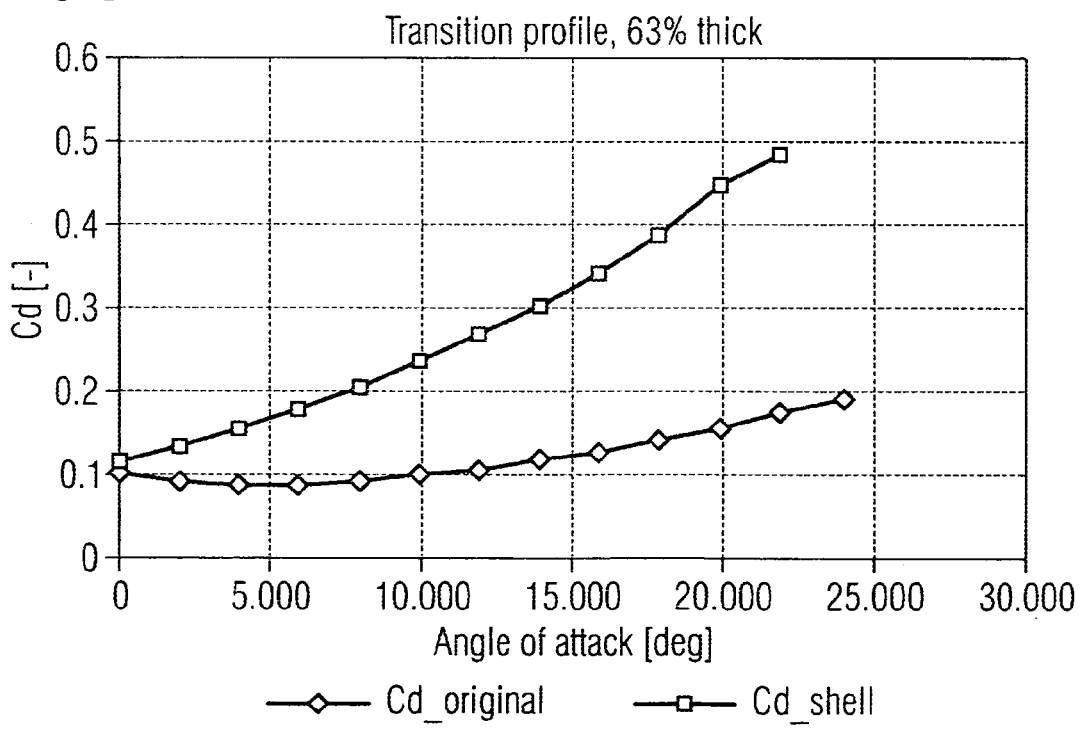
FIG. 6 shows the drag coefficients of the inventive and the state of the art profiles as a function of the angle of attack.

The transition profile with the cross section shown in FIGS. 4 and 7 has been proved to be advantageous over the state of the art profile, shown in FIG. 3, in wind tunnel tests. In addition, computational fluid dynamics calculations (CFD calculations) for the state of the art profile and the inventive profile have been performed. The results of these calculations are shown in FIGS. 5 and 6. FIG. 5 shows the lift coefficient $c_l$ as a function of the wind's angle of attack for the state of the art profile and the inventive profile, and FIG. 6 shows the drag coefficient $c_d$ for the state of the art profile and the inventive profile as a function of the wind's angle of attack while it is positive for the invention. With the area added to the transition profile's cross section, its lift coefficient $c_l$ of the transition profile has improved dramatically. Indeed, for the state of the art transition profile the lift is negative in almost the entire range of angles of attack while it is positive for the invention. In addition, compared to the state of the art transition profile, the inventive transition profile's drag coefficient $c_d$ has increased.

Based on the lift coefficient $c_l$ and drag coefficient $c_d$ values, a calculation of the annual energy production (AEP) has been performed. This calculation leads to an increase in AEP of about 1.5% for typical wind distribution. A full 3-dimensional calculation of the rotor using state of the art computational fluid dynamics even shows an improvement in AEP of about 3%. This indicates that the transition portion 7 also effects the airfoil portion 5 of the blade.

To investigate the influence on turbine loads comprehensive load calculations have been performed using the BHawC aeroelastic code. The results of the calculations showed very little influence on the overall loads.

The inventive rotor blade 1 can be realised by changing the manufacturing process for a turbine blade such that the profile of the transition portion 7 becomes a profile as it is shown in FIGS. 4 and 7. However, it is also possible to add the shell to a transition portion with a state of the art profile in the form of a separate piece fixed to the transition section. This is, in particular, useful to upgrade already existing rotor blades.

The invention claimed is:

1. A wind turbine rotor blade with a suction side and a pressure side, comprising:
    a cylindrical root portion;
    an airfoil portion defining the suction side and the pressure side; and
    a transition portion located between the airfoil portion and the root portion and which has a transition profile changing from the airfoil of the airfoil portion to the cylindrical profile of the root portion,
    wherein a maximum chord length of the airfoil portion is at least a maximum chord length of the transition portion,
    wherein the transition profile comprises a section with a concave curvature on the pressure side of the rotor blade,
    wherein a leading section of the transition profile is cylindrical and a trailing section of the transition profile is elongated, and
    wherein the section with the concave curvature is formed as an area added to a cross section of the transition section profile as compared to a transition profile in which the curvature of the pressure side is symmetric about the chord to the curvature of the section side, the area is delimited by a straight line extending from the suction side in a perpendicular direction to the chord at 100% chord length.

2. The rotor blade as claimed in claim 1, wherein the section with the concave curvature does not begin before 60% chord length.

3. The rotor blade as claimed in claim 2, wherein the section with the concave curvature extends to 100% chord length.

4. The rotor blade as claimed in claim 3, wherein the section with the concave curvature extends from 80% of the chord length to 100% of the chord length.

5. The rotor blade as claimed in claim 1, wherein the airfoil portion begins at a point of the rotor blade which is located between 15% and 25% of the total length of the rotor blade.

6. The rotor blade as claimed in claim 1, wherein the section with the concave curvature extends to 100% chord length.

7. The rotor blade as claimed in claim 2, wherein the section with the concave curvature extends from 80% of the chord length to 100% of the chord length.

8. The rotor blade as claimed in claim 2, wherein the airfoil portion begins at a point of the rotor blade which is located between 15% and 25% of the total length of the rotor blade.

9. The rotor blade as claimed in claim 3, wherein the airfoil portion begins at a point of the rotor blade which is located between 15% and 25% of the total length of the rotor blade.

10. The rotor blade as claimed in claim 4, wherein the airfoil portion begins at a point of the rotor blade which is located between 15% and 25% of the total length of the rotor blade.

11. The rotor blade as claimed in claim 1, wherein the airfoil portion having a chord length of a cross section of the airfoil portion, wherein a concave curvature of the pressure side of the airfoil is symmetric to a curvature of the suction side of the airfoil about the chord of the cross section of the airfoil.

12. The rotor blade as claimed in claim 1, wherein the added area is added to a symmetric cross section of the transition portion thereby making the cross section asymmetrical.

\* \* \* \* \*